United States Patent [19]

Gerken et al.

[11] Patent Number: 4,888,702
[45] Date of Patent: Dec. 19, 1989

[54] PHOTOVOLTAIC SYSTEM CONTROLLER

[75] Inventors: Kenneth F. Gerken, Olney, Md.; Robert A. Sullivan, Great Falls, Va.

[73] Assignee: Integrated Power Corporation, Rockville, Md.

[21] Appl. No.: 87,314

[22] Filed: Aug. 20, 1987

[51] Int. Cl.[4] .............................................. H02J 7/16
[52] U.S. Cl. ...................................... 364/494; 320/40; 320/62
[58] Field of Search ....................... 364/492, 493, 494; 320/39, 40, 61, 62; 323/906

[56] References Cited

U.S. PATENT DOCUMENTS

| | | | |
|---|---|---|---|
| 3,863,270 | 1/1975 | Haley et al. | 444/1 |
| 4,327,318 | 4/1982 | Kwon et al. | 320/39 |
| 4,390,940 | 6/1983 | Corbefin et al. | 323/906 |
| 4,455,614 | 6/1984 | Martz et al. | 364/494 |
| 4,551,980 | 11/1985 | Bronicki | 60/698 |
| 4,633,418 | 12/1986 | Bishop | 320/39 |
| 4,681,515 | 7/1987 | Allen | 417/218 |
| 4,689,544 | 8/1987 | Stadnick et al. | 320/46 |

OTHER PUBLICATIONS

Chetty et al, "Microprocessor-Controlled Digital Shunt Regulator", *IEEE Transactions on Aerospace and Electronic Systems*, vol. AES-16, No. 2, Mar. 1980.

*Primary Examiner*—Rodney B. Bovernick
*Assistant Examiner*—Terry S. Callaghan
*Attorney, Agent, or Firm*—Karen M. Gerken; Martin P. Hoffman

[57] ABSTRACT

A photovoltaic system controller particularly adapted for utilization with a photovoltaic power system including a photovoltaic array, system battery, load and, optionally, an auxiliary generator. The controller utilizes a microprocessor to monitor various parameters of the system and to perform system control functions. The microprocessor is provided with a plurality of setpoints corresponding to desired system parameters for utilization as reference points for the conducting of control functions. The setpoints are adapted to be easily field adjustable to cover a wide range of parameters. The controller is particularly suited for adaption to an entire spectrum of system designs merely by replacing the programmable memory component of the controller. The controller derives its power from a tap off the system battery and is designed to withstand the harsh environment associated with remote site locations. All of the control functions are temperature compensated. The controller is provided with timing control means which allows the controller to be inactive between operating cycles so as to reduce power requirements.

19 Claims, 3 Drawing Sheets

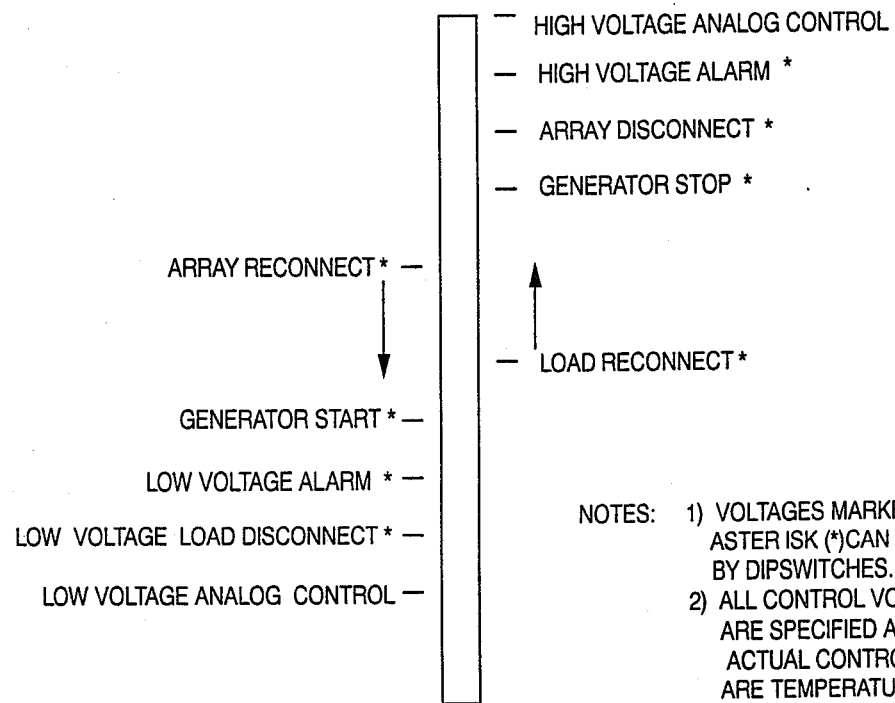

FIG. 4

- HIGH VOLTAGE ANALOG CONTROL
- HIGH VOLTAGE ALARM *
- ARRAY DISCONNECT *
- GENERATOR STOP *

ARRAY RECONNECT * —

— LOAD RECONNECT *

GENERATOR START * —
LOW VOLTAGE ALARM * —
LOW VOLTAGE LOAD DISCONNECT * —
LOW VOLTAGE ANALOG CONTROL —

NOTES: 1) VOLTAGES MARKED WITH AN ASTERISK (*) CAN BE RESET BY DIPSWITCHES.
2) ALL CONTROL VOLTAGES ARE SPECIFIED AT 25°C (77°F). ACTUAL CONTROL VOLTAGES ARE TEMPERATURE COMPENSATED

FIG. 5

DIP SWITCH SETTINGS 0 0 1 0 0 1 0 0 1 1

- BATTERY SYSTEM VOLTAGE TYPE
- HIGH VOLTAGE
- LOW VOLTAGE ALARM
- ARRAY CONNECT ALARM 1 0 1 0 0 1 0 1 0 1

- ARRAY DISCONNECT
- GENERATOR START
- LOAD RELAY TEMP CONFIG
- BATTERY TEMP COMPS 1 0 1 1 0 1 1 0 0 0

- LOAD DISCONNECT
- LOAD RECONNECT
- GENERATOR STOP
- NOT USED

PHOTOVOLTAIC SYSTEM CONTROLLER

BACKGROUND OF THE INVENTION

1. Field of the Invention

The invention pertains generally to a controller for monitoring and regulating photovoltaic (PV) power systems, ranging from relatively simple stand-alone PV power systems to larger PV/fuel generator hybrid power systems. More particularly, the invention is directed to a microprocessor-based programmable controller which is specifically designed for utilization at unattended system installations in remote sites with harsh environments, and which effectively achieves optimum charging of the system batteries by the photovoltaic array and/or the auxiliary generator. The controller is specifically adapted to regulate the PV array, to control the auxiliary generator, to manage the system load, to monitor and display system parameters and to energize an alarm in response to the occurence of certain critical system conditions. The controller accomplishes the foregoing functions by means of a microprocessor having a control algorithm which is uniquely capable of being redefined to accommodate new and diverse PV system control schemes.

The stand-alone PV power system typically includes a PV array comprising an assembly of solar photovoltaic cells connected in a series parallel configuration, and a system battery comprising a block of batteries which are charged by current from the PV array to serve as the primary power source for a load. Although system efficiency dictates that the battery receive the maximum possible amount of charge, it is essential to accurately regulate the PV array in order to prevent battery overcharge with its associated excess gassing and potential destruction of the battery. In view of the fact that the battery represents a very costly and sensitive component in the PV power system, the importance of successful and precise regulation of battery charge is even further intensified.

The controller of the present invention initiates charge regulation for the battery when the system voltage reaches a predetermined level, being adapted to disconnect the array from the battery so as to allow the system voltage to fall to a more desirable level. When the battery voltage reaches a second lower setpoint, the controller is adapted to effect reconnection of the array to resume battery charging. The controller is thus capable of insuring optimum battery charging and maximization of battery life.

It is similarly important that the battery in a PV power system be protected from a state of undercharge, which can cause damaging reversal of polarity of the battery. Hence, it is essential that a control mechanism be provided for regulating the powered load so as to prohibit adverse depletion of the battery charge by the load when the PV array is unable to adequately charge the battery. The subject controller provides such a mechanism by accomplishing disconnection of the load from the battery at a predetermined system voltage in order to interrupt the battery discharge mode. The load disconnect function of the controller possesses a built-in time delay feature that prevents nuisance disconnections. Once disconnected, the load is adapted to remain disconnected until a higher system voltage setpoint is reached, at which time the controller effects reconnection of the batteries to the load.

The typical hybrid power system includes, in addition to the PV array, battery and load, a fuel consumable Thermo Electric Generator (TEG) or Diesel Electric Generator (DEG). Depending upon system design, the latter generators may be utilized to charge the system battery as a supplement to the PV array when the array is deliberately undersized, when the array fails to maintain a desired system voltage, or as a function of the ambient temperature of the system, to serve as a back-up for the PV array in the event of a system failure or to directly power the load, as dictated by design requirements.

The controller of the present invention is able to control operation of a generator to maintain the desired battery state of charge or in response to other diverse system conditions. Typically, the controller will initiate operation of a generator when the battery voltage falls to a predetermined setpoint. Once the controller has caused the generator to be turned on, the generator generally will remain on until the battery voltage, as determined by the microprocessor, reaches a higher predetermined level.

All of the control functions of the present controller are based upon the temperature compensated system voltage. Similarly, all of the controller functions are corrected for temperature by means of a coefficient incorporated into the control algorithm. The applicable compensation coefficient is adapted to be adjusted in the field to one from a range of available coefficients by setting a DIP switch. The controller thus effectively accommodates the fact that battery characteristics, including voltage, vary with ambient temperature, and age, thereby resulting in superior accuracy of control and operation.

Moreover, all of the foregoing setpoints, namely, the array disconnect and reconnect setpoints, the load disconnect and reconnect setpoints and the generator start and stop setpoints, are adapted for easy adjustment in the field over a wide range by means of a bank of DIP switches, so as to accommodate an entire spectrum of system operating parameters.

The subject photovoltaic system controller is further adapted to monitor system status, being capable of performing continuous system diagnostic functions. The controller may be provided with an annunciator panel including LED system status indicators, as well as a digital meter for reading voltages, currents and temperatures. The indicators may selectively display "normal" system status, i.e. normal charging or discharging of the battery; system voltage; array, load and battery currents; and ambient temperature. The display system is particularly designed to require only a small amount of power.

Additionally, the photovoltaic system controller is capable of providing an alarm when the system voltage falls below a field adjustable low alarm setpoint. The controller is adapted to light an alarm LED, and is able to send a signal which may activate an external alarm.

The foregoing capabilities are provided by the logic unit of the controller, wherein processor-based design provides powerful, flexible control and capability. The control algorithm for the logic unit is characterized by non-volatile memory storage to insure that system operation returns to normal following any loss of, or temporary drop in, system voltage below the minimum required for controller operation. Of particular significance is the fact that the control algorithm may be easily redefined merely by replacing the erasable programmable memory component. The controller is thus able to be adapted to standard as well as custom programming to afford a broad variety of system applications.

The controller incorporates digital circuitry which does not require periodic adjustments or alignments in order to maintain control accuracy. Also included is an emergency back-up control, comprising analog circuits, for the array and load relays in the event of loss of main controller function. Moreover, the controller's memory, logic functions, data/control bus, and input/output ports are all integral to a single circuit, thus providing advantageously for fewer parts. A further unique characteristic is that the controller derives its operating power from the system battery.

The controller is designed in conformance with commercial and military standards, and is adapted for use over long periods. The logic unit is enclosed in a heavy steel casing which is easy to install and which is able to shield against transient surges. Thus, the controller is uniquely suited to withstand the vibration and noise conditions typical of diesel generator installations, as well as the harsh physical environments typical of remote site applications. Finally, the controller is able to realize an efficiency rating better than 99% while being adapted for utilization by relatively unskilled personnel.

2. Description of the Prior Art

The prior art discloses means for controlling the photovoltaic charging of storage batteries. For example, U.S. Pat. No. 4,327,318 to Kwon et al teaches a source shedding voltage regulator which selectively sheds portions of the PV array into or from the charging system by switching means in response to the terminal voltage of the storage battery. Voltage monitoring means compares the terminal voltage to a predetermined reference potential. Logic means provides a control signal to initiate shedding.

U.S. Pat. No. 4,551,980 to Bronicki discloses a hybrid power generating system wherein a current sensor senses the current produced by a PV array and a charge level detector continuously monitors the charge level of a battery in relation to a predetermined percentage of full battery charge. A logic circuit initiates start-up of the generator when no current is being produced by the PV array.

Chetty et al, in "Microprocessor-Controlled Digital Shunt Regulator" shows a microprocessor-controlled regulator which adds or removes solar array sections to maintain the shunt current between its maximum and minimum limits.

The prior art fails to disclose a photovoltaic system controller which is characterized by reduced power requirements, is able to withstand the harsh environment of remote sites, requires little maintenance and adjustment for unattended installations, and incorporates a microprocessor having a reprogrammable memory for adapting the controller to diverse operating parameters. The prior art also does not teach or suggest a photovoltaic system controller wherein a plurality of setpoints may be provided to the microprocessor, all of the setpoints being field adjustable. The prior art does not disclose a controller which is adapted to completely monitor and regulate a stand-alone PV power system or a PV hybrid power system by regulating the PV array, managing the powered load, controlling an auxiliary generator, displaying system status and indicating the occurence of certain critical events in the system.

SUMMARY OF THE INVENTION

The invention is directed to a photovoltaic system controller specifically adapted for utilization with a PV power system including a PV array, a system battery charged by the PV array, a load powered by the system battery and, optionally, an auxiliary fuel consumable generator. The controller is particularly adapted to withstand the harsh environment typical of remote sites, as well as the noise and vibration associated with generator installations. The controller is completely self-sufficient, making it ideally suited for unattended locations.

The subject invention comprises a fully enclosed logic unit disposed within an outer equipment enclosure. The logic unit includes a logic board which is isolated from the input/output board so as to protect it from adverse electrical noise and interference. The logic unit incorporates a microprocessor utilizing an erasable programmable memory (EPROM) component that is adapted to be easily replaced in order to adapt the controller to diverse operating parameters and control functions.

The controller is powered by means of a 12 V tap off of the system battery. The input wiring for the logic unit is isolated from the power system wiring. The logic unit is adapted to receive input data relating to battery voltage and current and load current. The control algorithm provided by the EPROM allows the microprocessor to utilize the input data, which has been corrected for temperature, to perform various control functions in relation to particular predetermined setpoints provided to the microprocessor through DIP switch settings. The setpoints are adapted to be changed as desired to one of a range of setpoints merely by adjusting the DIP switches. Additionally, the controller is adapted to display system status, as well as a variety of system conditions.

DESCRIPTION OF THE DRAWINGS

FIG. 4 is a chart depicting the relationship between the various controller setpoints; and FIG. 5 is a representative dipswitch setting diagram for the controller.

DESCRIPTION OF THE PREFERRED EMBODIMENT

Figure 1:
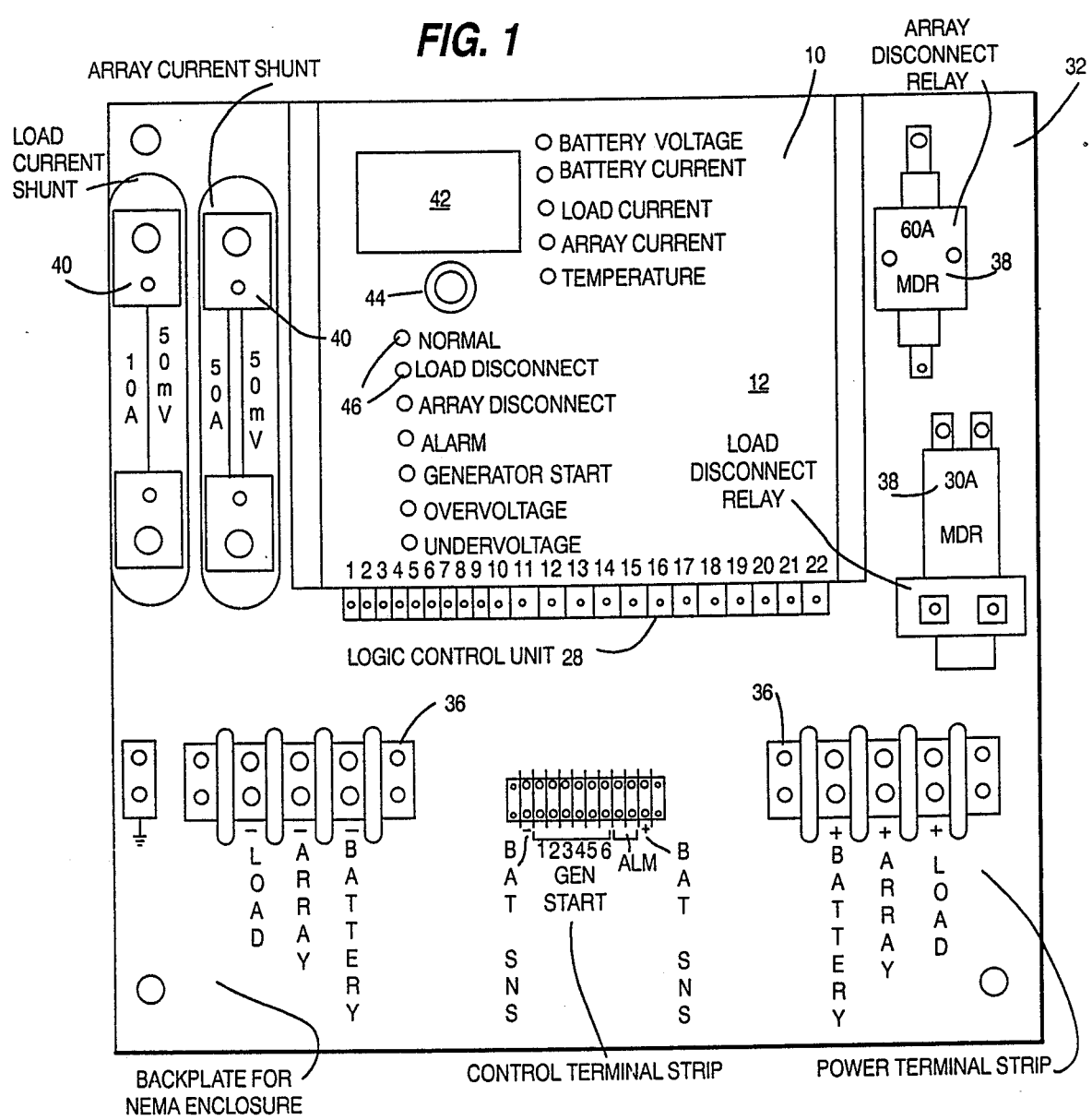
FIG. 1 is a front plan view of the controller of the present invention showing the logic unit as it appears when mounted on the NEMA enclosure backplate.
Figure 2:
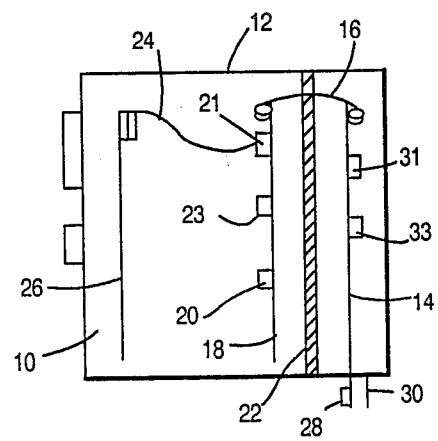
FIG. 2 is a partial representational side sectional view of the logic unit.

With reference to FIGS. 1 and 2, the controller of the present invention comprises a logic unit 10 housed in a completely enclosed six-side stainless steel casing 12. As can best be seen in FIG. 2, inside the casing is an Input-/Output (I/O) board 14 which is connected at 16 to a logic board 18 upon which is mounted a Z-80 microprocessor 20, an expansion bus 21 and an EPROM memory chip 23. The logic board is isolated from the I/O board by means of a vertical metal plate 22. The metal plate isolates and shields the logic board from electrical noise and other interference, thereby ensuring protection of the microprocessor. The casing 12 is specifically designed to protect the logic unit, not only from transient surges, but from the harsh environment typically found at remote sites, as well as the vibration associated with fuel consumable generator installations.

The logic board is cable connected at 24 to a display board 26. Apart from the components particularly noted herein, the circuitry for the display board, the logic board and the I/O board is deemed to be conventional, being known to those skilled in the art, and is not considered to form part of the claimed invention.

A terminal strip 28 for connection of input and output sensing wires is provided on a portion of the I/O board 10 which extends downwardly from the metal casing 12. A downwardly projecting metal lip 30 is provided on the casing in order to protect the I/O board extension. This small extension of the I/O board is the only portion of the logic unit which is not completely housed inside the casing 12. A solid state temperature sensor 31 and a plurality of relay drivers 33 (only one of which is shown) are provided on the I/O board.

With particular reference to FIG. 1, the logic unit is mounted on a metal back plate 32 disposed inside a larger NEMA metal equipment enclosure having a hinged door (not shown). In addition to the logic unit, the back plate has mounted thereon a main terminal block 36, a plurality of system relays 38, preferably of the mercury displacement type, and a series of shunts 40 calibrated for current measurement. Wiring from the various system components is connected at the main terminal block, from which the sensing wires are connected to the terminal strip 28 on the I/O board extension. In this manner, the heavy system wiring is isolated from the logic unit, which receives its input from the smaller sensing wires. The front surface of the logic unit is provided with a digital display meter 42, a display selector button 44 and a plurality of display LED's 46.

Figure 3:
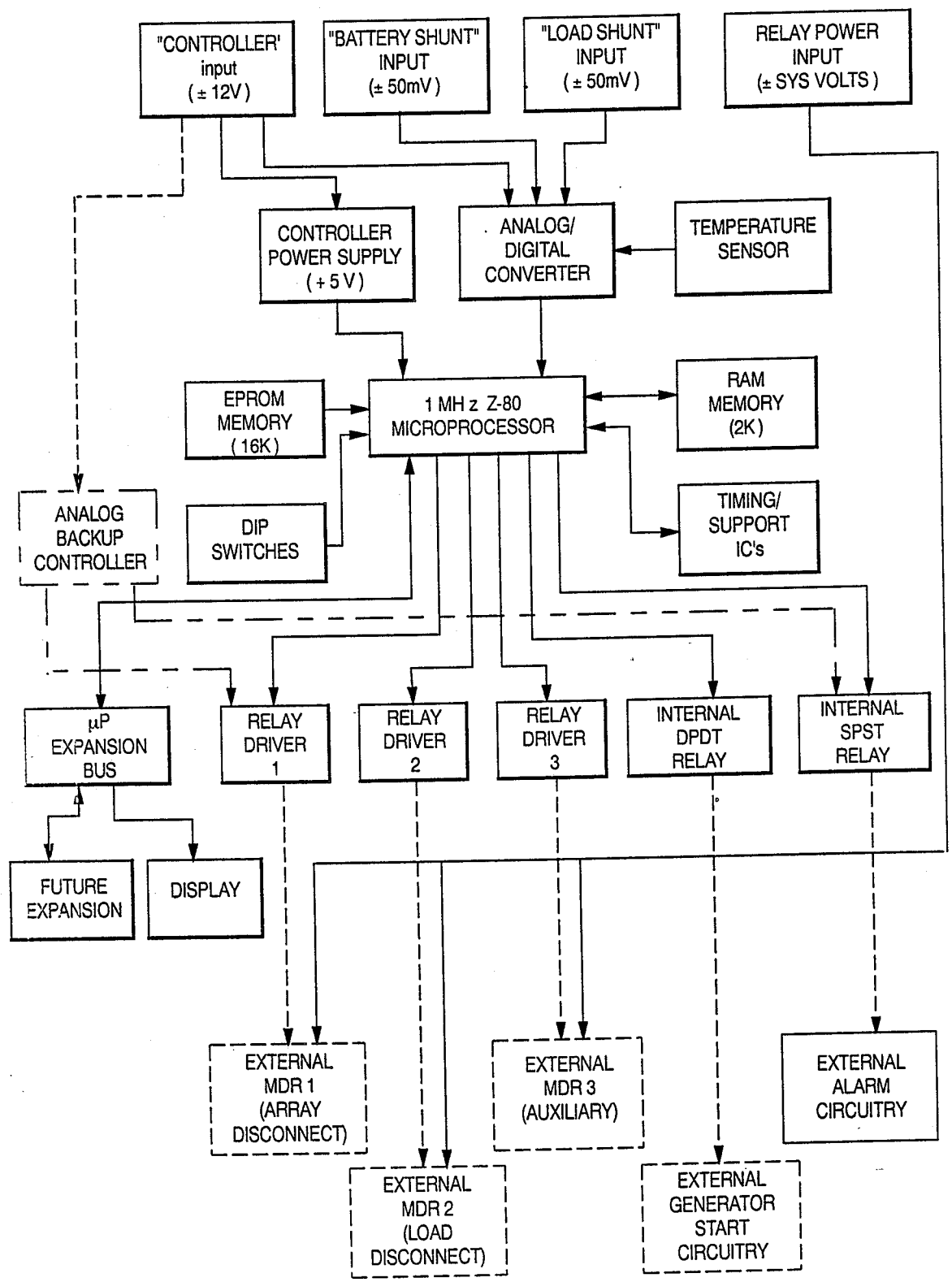
FIG. 3 is a flow chart showing the relationship between the main components of the controller.

As previously noted, logic unit casing 12 is a weather-resistant, stainless steel casing which is capable of shielding against transient surges so as to protect the microprocessor from damage. The enclosure which receives backplate 32 is a standard NEMA type equipment enclosure. Each of the enclosures is capable of withstanding severe environmental conditions, as well as the noise and vibration of generator installations. The controller is designed to operate over a temperature range of −40° C. to 60° C. and a humidity range of 0 to 100% relative humidity. Operation of the controller can best be described in conjunction with the flow chart depicted in FIG. 3. The controller is powered by tapping off a 12 V block of the main system battery. This 2 V tap, or CONTROLLER INPUT, is regulated by the CONTROLLER POWER SUPPLY to approximately 5 V. This feature is considered to be unique over prior art devices, in that prior art controllers, which are characterized by a high parasitic load, derive their power from the entire battery bank. The power demands of a prior art discrete-type controller are too great to allow a tap off a 12 V battery because the high draw would inevitably lead to battery undercharge. The present controller is able to overcome the high power demands generally associated with prior art devices because of its relatively small parasitic load, generally only around 35 mA and because it incorporates circuitry, to be further discussed herein, which provides a "sleep" feature for the controller.

In addition to providing power for the controller, the controller input measures the battery voltage to obtain a reference so as to provide an analog reference voltage for calculations to be performed by the microprocessor. Similarly, one of the shunts 40 mounted on back plate 32 measures battery current for the system (BATTERY SHUNT INPUT), while the other of the shunts 40 measures the load current (LOAD SHUNT INPUT). The latter measurements are converted from analog to ditigal form by an ANALOG/DIGITAL CONVERTER and serve as input data for the microprocessor. The solid state TEMPERATURE SENSOR 31 measures ambient temperature, the value for which is similarly converted to digital form and provided as input to the microprocessor.

The foregoing inputs are provided to the Z-80 MICROPROCESSOR 20 mounted on the logic board. The microprocessor is utilized to perform all of the system calculations and controller operations. The microprocessor is utilized in conjunction with a non-volatile memory chip (EPROM MEMORY) 23 provided on the logic board, which contains the operational software or particular control algorithm which has been incorporated into the controller The particular control algorithm "burned into" the EPROM may assume many forms, depending upon design requirements for the PV system and, hence, does not form part of the present invention. Indeed, the present controller contemplates replacement of the EPROM to adapt the controller to an entirely different set of operating functions. The program variables are temporarily stored in random access memory (RAM MEMORY).

A bank of DIP SWITCHES shown in FIG. 5, preferably thirty, are provided on the logic board and are adapted to be manually adjusted to select the various system setpoints from an available range of setpoints, which are utilized by the microprocessor as reference points in the control algorithm and which determine the various operational functions of the controller. The DIP switches and their associated setpoints are discussed hereafter in greater detail.

The "sleep" feature that is a unique characteristic of the subject controller is accomplished by means of miscellaneous TIMING/SUPPORT integrated circuits which are utilized in the overall operation of the microprocessor. The "sleep" feature makes the 12 V tap providing power for the controller feasible by timing the circuitry to be turned off for a certain interval, from milliseconds to two seconds, followed by being turned on for a certain interval while the controller performs all of its monitoring and regulating functions generally for only a few milliseconds. By being turned off for most of the time, the controller's power requirements are greatly reduced, in contrast with prior art devices which are continually "on" and, hence, continually drawing power.

RELAY DRIVERS 33 which are provided on the I/O board are each adapted to actuate a respective EXTERNAL (MDR) MERCURY DISPLACEMENT RELAY 38 mounted on the back plate 32 in response to a signal from the microprocessor. Each of the relays 38 is adapted to perform a particular system function to be discussed further herein. Power for the relays 38 is provided by a RELAY POWER INPUT connection which supplies current for operating the external relays.

Additionally, the controller may include a printed circuit board mounted INTERNAL DOUBLE POLE DOUBLE THROW (DPDT) RELAY and a printed circuit board mounted INTERNAL SINGLE POLE SINGLE THROW (SPST) RELAY which, in response to a signal from the microprocessor, are utilized to perform various control functions, such as starting an auxiliary generator by means of EXTERNAL GENERATOR START CIRCUITRY and actuating an external alarm by means of EXTERNAL ALARM CIRCUITRY.

The EXPANSION BUS 21 located on the logic board provides a socket connection for optional FUTURE EXPANSION to another printed circuit board inside or outside the controller for additional inputs and outputs, or to a real time clock, etc. The expansion bus also serves to connect the microprocessor to the DISPLAY printed circuit board 26 containing a solid state meter, status LED's and display selector switch. Because the display is connected through the expansion bus, a display failure has no adverse effect on the controller. The display meter is adapted to remain off until such time as the selector button is manually depressed to visually display the desired system parameter. The appropriate status indicator, although normally on, is designed to blink so as to reduce power consumption. The controller further includes an ANALOG BACKUP CONTROLLER utilizing analog circuitry which is adapted to assume basic control functions in the event of a microprocessor failure. The analog backup derives its power from the 12 V tap off the system battery previously described.

Thus, the controller of the present invention is powered through a 12 V tap off of the system battery and senses input data typically relating to battery system voltage, battery current and load current. These parameters are sensed by the controller by mean of a plurality of input sensing wires connected to the terminal strip 28 provided on the I/O board extension from the main terminal block on the backplate The system wiring from the PV array, the battery and the load are connected to the main terminal block and do not go directly into the logic unit. The controller's microprocessor utilizes these inputs to perform a variety of monitoring and regulating functions in accordance with the control algorithm of the EPROM. The control algorithm or software that is "burned into" the EPROM will vary according to the particular PV power system and its design and operational requirements. The design and operational requirements of the system will dictate the various functions which the controller is to perform, depending upon certain setpoints for the monitored variables in the system. The specific setpoints are "set", or communicated, to the microprocessor through a plurality of DIP switches.

The relationship of the diverse setpoints to the control functions can best be understood in conjunction with the chart set forth in FIG. 4. The functions of the photovoltaic system controller typically involve PV array regulation, load management, auxiliary generator control, monitoring of system parameters and alarm functions. PV array regulation is necessary in order to protect the battery from overcharge due to mismatch between the available solar radiation and the specific load profile. The subject controller is adapted to ensure that the battery receives the maximum possible amount of charge while preventing overcharge and excess gassing. The system voltage and battery current which are provided as digital input signals to the microprocessor are temperature compensated and evaluated according to the control algorithm with respect to a predetermined system voltage, called the ARRAY DISCONNECT setpoint. The Array Disconnect setpoint generally corresponds to an 85-95% battery state of charge, depending upon the exact charging current. Charge regulation is initiated when the actual system voltage determined by the microprocessor reaches the Array Disconnect setpoint. The microprocessor then signals the appropriate relay driver to open the external array disconnect mercury displacement relay, thereby disconnecting the array from the battery. Actuation of the relay causes the system voltage to fall as the battery switches from charge mode to open circuit or discharge mode. When the microprocessor determines that the battery voltage has reached a second lower level, called the Array Reconnect setpoint, the controller signals the appropriate relay to reconnect the array, resuming charging.

Load management functions performed by the controller consist of preventing battery undercharge, and possible polarity reversal, by actuating a low voltage alarm followed by disconnection of the load if the system voltage continues to fall. The system voltage is determined by the microprocessor based upon the microprocessor input and analyzed according to the control algorithm with respect to a Low Alarm setpoint. If the system voltage reaches the Low Alarm setpoint, the microprocessor causes the "UNDER VOLTAGE" and "ALARM" LED's on the display panel of the logic unit to light. Furthermore, the internal SPST relay is capable of sending a signal through alarm circuitry for activating an external alarm.

If the system voltage falls to the Load Disconnect setpoint, the microprocessor will cause the appropriate relay driver to open the load disconnect mercury displacement relay to disconnect the load form the battery. The timing integrated circuit provided on the logic board serves to prevent nuisance disconnects of the load by creating a built-in time delay. The system voltage must remain below the load disconnect threshold for approximately three minutes before the controller actually causes the relay to be opened. During this time, the red "LOAD DISCONNECT" LED will flash, but the load will remain connected. Once the load has been disconnected, it remains disconnected until the microprocessor determines that the system voltage has risen to the Load Reconnect setpoint.

The controller provides for auxiliary generator control in a PV hybrid power system by means of the internal DPDT relay, which controls starting and stopping of a Thermo Electric Generator (TEG) or Diesel Electric Generator (DEG). The microprocessor is adapted to effect actuation of an auxiliary generator upon its determining that the battery voltage has fallen to a setpoint known as the GEN START setpoint, corresponding to between 20% and 70% state of charge, depending upon the type and specification of the power system. Once the generator has been turned on, it remains on until the battery reaches the GEN STOP setpoint.

The controller is capable of indicating system status through the series of LED's 46 on the front cover of the logic unit 10. During normal charging or discharging of the battery, a green "NORMAL" LED will be flashing. The "NORMAL" indicator is replaced by other blinking LED's depending on the actual system status, e.g. "LOAD DISCONNECT" "ARRAY DISCONNECT", "ALARM", "GENERATOR START", "OVERVOLTAGE" and "UNDERVOLTAGE".

In addition to system status, the controller is specifically adapted to display system voltage, battery, load and array currents, as well as ambient temperature on display meter 42. The display is activated by manually pressing the display button 44 and holding it down until the display appears. Each of the values can be read by depressing the button until the respective LED's light to show that the desired value is being displayed. The controller thus conserves battery power by maintaining the display in a generally unlighted or "off" mode until such time as the display button is depressed. The LED's that are normally on to indicate system status are adapted to blink in order to reduce power requirements. Finally, the display will remain on for only about 90 seconds after the button is pushed, then automatically turns itself off in a further effort to conserve battery power.

A salient feature of the subject invention pertains to the controller's ability to accommodate a wide range of operating parameters. In this regard, all of the predetermined setpoints hereinbefore discussed, which dictate when and what the controller does, are easily field adjustable to conform to diverse system requirements. The adjustment is achieved by means of a bank of DIP switches, preferably thirty, as shown in FIG. 5. These DIP switches are adapted to be manually adjusted in the field to reset the High Voltage Alarm setpoint, the Array Disconnect setpoint, the Generator Stop setpoint, the Array Reconnect setpoint, the Load Reconnect setpoint, the Generator Start setpoint, the Low Voltage Alarm setpoint and the Low Voltage Load Disconnect setpoint. The settings are adjusted by establishing a reference diagram wherein the various possible combinations of DIP switch settings correspond to the various setpoint values.

An additional salient feature of the controller relates to replacement of the EPROM. The microprocessor controller is adapted to be reprogrammed by replacing the program memory chip in the logic board with a new EPROM containing a different set of instructions. The EPROM is supplied in a Zero Insertion Force Socket to facilitate replacement.

Although a preferred embodiment of the subject invention has been specifically illustrated and described herein, it is to be understood that minor variations may be made in the details of the controller without departing from the spirit and scope of the invention as described in the appended claims.

What is claimed is:

1. A photovoltaic system controller for utilization with a photovoltaic power system including at least a photovoltaic array, a system battery adapted to be charged by said array and a load adapted to be powered by said battery, said controller comprising a microprocessor having an erasable programmable memory, said microprocessor having means to receive input data from said array, said battery and said load, said microprocessor having means to evaluate said input data in relation to at least one predetermined setpoint, said microprocessor in response to said evaluation being adapted to disconnect said battery from said array or to disconnect said load from said battery, said setpoint being adapted to be adjusted to a second setpoint by adjustment means, said erasable programmable memory being adapted to be changed whereby said evaluation performed by said microprocessor is also changed.

2. The photovoltaic system controller recited in claim 1, wherein said adjustment means comprises a plurality of adjustable DIP switches.

3. The photovoltaic system controller recited in claim 1, wherein said disconnections are accomplished by means of mercury displacement relays.

4. The photovoltaic system controller recited in claim 1, wherein said controller is powered by means of a 12 volt tap off said system battery.

5. The photovoltaic system controller recited in claim 1, wherein said photovoltaic system further comprises generator means, said microprocessor being adapted to effect starting and stopping of said generator means, said starting and stopping being accomplished by means of a relay.

6. The photovoltaic system controller recited in claim 1, wherein said microprocessor is adapted to actuate a visual alarm indicator.

7. The photovoltaic system controller recited in claim 1, further comprising a display panel, said display panel being adapted to visually display the voltage and current of said battery, the current of said load, the current of said array and ambient temperature.

8. A photovoltaic system controller for utilization with a photovoltaic power system including at least a photovoltaic array, a system battery adapted to be charged by said array and a load adapted to be powered by said battery, said controller being adapted to be powered by tapping from said battery, said controller comprising a logic unit, said logic unit including an input/output board, a logic board and a display board, said input/output board and said logic board being separated from each other by isolation means, said logic board including a microprocessor, said microprocessor having means to receive input data at least from said battery, said microprocessor having means to compare said input data to at least one predetermined setpoint provided to said microprocessor, said setpoint being adapted to be adjusted to another second setpoint, said input data being temperature compensated.

9. The photovoltaic system controller recited in claim 8, wherein said isolation means comprises a metal plate electrically isolating said logic board from said input/output board.

10. The photovoltaic system controller recited in claim 8, wherein said input data comprises the voltage and current of said battery, and the current of said load, said microprocessor being adapted to calculate the voltage for said system based upon said input data.

11. The photovoltaic system controller recited in claim 10, wherein said microprocessor is provided with an array disconnect setpoint, an array reconnect setpoint, a load disconnect setpoint and a load reconnect setpoint, said microprocessor being adapted to effect disconnection of said array from said battery when said system voltage reaches said array disconnect setpoint, reconnection of said array to said battery when said system voltage reaches said array reconnect setpoint, disconnection of said load from said battery when said system voltage reaches said load disconnect setpoint and reconnection of said load to said batter when said system voltage reaches said load reconnect setpoint.

12. The photovoltaic system controller recited in claim 11, wherein said logic unit is provided with timing control means to delay disconnection of said load for a brief time after said system voltage reaches said load disconnect setpoint.

13. The photovoltaic system controller recited in claim 10, wherein said photovoltaic system further comprises an auxiliary generator and said microprocessor is provided with a generator start and a generator stop setpoint, said microprocessor being adapted to effect starting of said generator when said system voltage reaches said generator start setpoint and stopping of said generator when said system voltage reaches said generator stop setpoint.

14. The photovoltaic system controller recited in claim 10, wherein said microprocessor is further provided with a high voltage alarm setpoint and a low voltage alarm setpoint, said microprocessor being adapted to actuate a visual indicator when said system voltage reaches said low voltage alarm and high voltage alarm setpoints.

15. The photovoltaic system controller recited in claim 8, wherein said at least one setpoint is adapted to be adjusted by means of a plurality of DIP switches.

16. The photovoltaic system controller recited in claim 8, further comprising an analog backup controller, said analog backup controller being adapted to be operated in the event said microprocessor fails.

17. The photovoltaic system controller recited in claim 8, further comprising an expansion bus.

18. A method of using a photovoltaic system controller in a photovoltaic power system comprising a PV array, a system battery and a load, said controller being characterized by a logic unit enclosed in a casing, said logic unit having a logic board and an input/output board, said logic board having a microprocessor, an erasable programmable memory component and adjustment means for providing at least one predetermined setpoint to said microprocessor, said input/output board having a terminal strip, said controller having a main terminal block, a plurality of shunts and a plurality of relays, said method comprising the steps of:
   opening said casing to gain access to said logic board;
   adjusting said adjustment means to a desired setpoint;
   closing said casing;
   electrically connecting said battery, said load and said array to said main terminal block;
   electrically connecting said load to one of said shunts and to one of said relays;
   electrically connecting said array to another of said shunts and to another of said relays; and
   electrically connecting said main terminal block to said terminal strip.

19. The method recited in claim 18, further comprising the steps of:
   opening said casing to gain access to said logic board;
   removing said erasable programmable memory component from said logic board;
   placing a new erasable programmable memory component on said logic board; and
   closing said casing.

* * * * *